United States Patent
Salminen et al.

(10) Patent No.: US 9,636,686 B2
(45) Date of Patent: May 2, 2017

(54) MINERAL MATERIAL PROCESSING PLANT AND A METHOD FOR OPERATING A PROCESSING PLANT

(71) Applicant: Metso Minerals, Inc., Helsinki (FI)

(72) Inventors: Vesa-Matti Salminen, Kangasala (FI); Jouni Hulttinen, Ylojarvi (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 14/237,413

(22) PCT Filed: Sep. 4, 2013

(86) PCT No.: PCT/FI2013/050854
§ 371 (c)(1),
(2) Date: Feb. 6, 2014

(87) PCT Pub. No.: WO2015/033012
PCT Pub. Date: Mar. 12, 2015

(65) Prior Publication Data
US 2016/0184832 A1    Jun. 30, 2016

(51) Int. Cl.
*B02C 21/02* (2006.01)
*B07B 1/00* (2006.01)
(Continued)

(52) U.S. Cl.
CPC ............ *B02C 21/02* (2013.01); *B02C 23/08* (2013.01); *B07B 1/005* (2013.01); *B65G 21/10* (2013.01); *B65G 41/002* (2013.01)

(58) Field of Classification Search
CPC ......... B02C 21/02; B02C 23/08; B07B 1/005; B65G 21/10
(Continued)

(56) References Cited

U.S. PATENT DOCUMENTS 3,614,823 A    10/1971  Weber et al.
4,383,651 A *  5/1983  Couperus ............... B02C 21/02
                                                           241/101.76
(Continued)

FOREIGN PATENT DOCUMENTS

CA    1309963 C    11/1992
GB    2 092 915 A    8/1982
(Continued)

OTHER PUBLICATIONS

"Nordberg NW Series Portable Plants for Closed Circuit Crushing", Brochure No. 1415-03-03-SAM/Sorocaba-English, 2008, Metso Minerals.
(Continued)

*Primary Examiner* — Faye Francis
(74) *Attorney, Agent, or Firm* — Andrus Intellectual Property Law, LLP (57) ABSTRACT

A mineral material processing plant includes a frame; a crusher; a centrifugal conveyor; and a first conveyor; and the centrifugal conveyor includes a first idler drum and a second idler drum and a main conveyor belt surrounding the idler drums, a pivot and a folding head which is pivotable around the pivot; and the folding head includes a movable frame to which the second idler drum is bearing-mounted, to connect the centrifugal conveyor in material transport connection with the first conveyor and away from said material transport connection. A pivot point of the pivot is located in a region inside the circumference of the main conveyor belt. A method for operating a processing plant is also disclosed.

25 Claims, 4 Drawing Sheets

(51) Int. Cl.
*B65G 21/10* (2006.01)
*B65G 41/00* (2006.01)
*B02C 23/08* (2006.01)

(58) Field of Classification Search
USPC .................................... 241/101.4–101.742
See application file for complete search history.

(56) References Cited

U.S. PATENT DOCUMENTS

| | | | |
|---|---|---|---|
| 4,598,875 A | 7/1986 | Bronson et al. | |
| 6,705,449 B2 * | 3/2004 | Wagstaffe | B07B 1/005 198/313 |
| 7,143,968 B2 * | 12/2006 | Brock | B02C 21/02 241/101.76 |
| 8,020,691 B2 | 9/2011 | Niklewski | |

FOREIGN PATENT DOCUMENTS

| | | |
|---|---|---|
| GB | 2 132 970 A | 7/1984 |
| WO | 97/41971 A1 | 11/1997 |

OTHER PUBLICATIONS

International Search Report dated Oct. 1, 2014.

* cited by examiner

PRIOR ART

Fig. 12

MINERAL MATERIAL PROCESSING PLANT AND A METHOD FOR OPERATING A PROCESSING PLANT

CROSS-REFERENCE TO RELATED APPLICATIONS

This application claims priority to PCT/FI2013/050854, filed Sep. 4, 2013, and published in English on Mar. 12, 2015 as publication number WO 2015/033012 A1, incorporated herein by reference.

TECHNICAL FIELD

The invention relates to mineral material processing. The invention relates particularly, though not exclusively, to conveyor solutions in a mineral material processing plant.

BACKGROUND ART

Mineral material, for example rock, is gained from the earth for crushing by exploding or excavating. The rock can also be natural rock and gravel or construction waste. Mobile crushers and stationary crushing applications are used in crushing. An excavator or wheeled loader loads the material to be crushed into the crusher's feed hopper from where the material to be crushed may fall in a jaw of a crusher or a feeder moves the rock material towards the crusher. The material to be crushed may also be recyclable material such as concrete, bricks, or asphalt.

A conveyor often increases the length, width and/or height of the plant in a movable mineral material processing plant. Therefore the conveyor may be positioned in another location during operation than during transport or service of the plant. Moving the conveyor from the operation position of the plant to the transport or service position of the plant requires in some cases detaching of the conveyor from place. Additionally the conveyor is fixed to the plant for the transport. In many cases the entire conveyor must be moved from its location, for example in order to keep the conveyor inside transport dimensions (height, width, length) which are allowed or require a permission in road traffic.

In some known mineral material processing plants a crusher/screen is fed by a single part conveyor which is moved to a transport/service position by moving the conveyor towards a feeding end and downwards. A known screen is supported by telescopic operating legs on a frame of a processing plant. Another known screen is supported to the frame of the processing plant by pivoted legs which together with the screen and the frame form a four-bar linkage.

Moving mechanisms used for the moving of the conveyor are heavy and expensive constructions. The moving of the conveyor away from the crusher requires space at the feeding end of the plant which may be problematic if the plant in question is a mobile crushing plant which is operating in a process of several plants and a feeding machine is close. The plant must then be moved before service. Sliding mechanisms and telescopic operating legs are used for longitudinal moving of the conveyor in the plant. The sliding mechanisms tolerate poorly dirty circumstances and are sensitive with respect to production inaccuracy.

In a known movable crushing and screening plant the material which is crushed in a crusher is circulated by conveyors in a closed loop from the crusher to a screen. The overs of the screen is guided to the crusher. The product passing through the screen can be guided to further processing in the same plant or another plant which processes mineral material, or to a pile. A long single part conveyor is used in this closed loop plant for feeding the screen which conveyor is moved to a transport position by cylinder operations. The long conveyor which is feeding the screen is at side of the crusher what increases transport width and causes that when the screen is fed the material has to be moved sideways from a main conveyor to a feed conveyor for example by a vibration chute or hopper. Then the process includes an extra wearing part (vibration chute, hopper) and the material arrives to the screen from a side direction wherein spreading of the material evenly on the screen is problematic. Alternatively the plant must include an expensive, heavy, and often unreliable moving mechanism by which the conveyor can be moved off the crusher for transport and service of the crusher. Alternatively the conveyor must be lifted by a separate hoist which must be brought beside the plant which is expensive and time consuming.

Publication U.S. Pat. No. 8,020,691 B2 shows a first belt conveyor by which material is lifted onto a second belt conveyor taking advantage of the centrifugal force.

Figure 12:
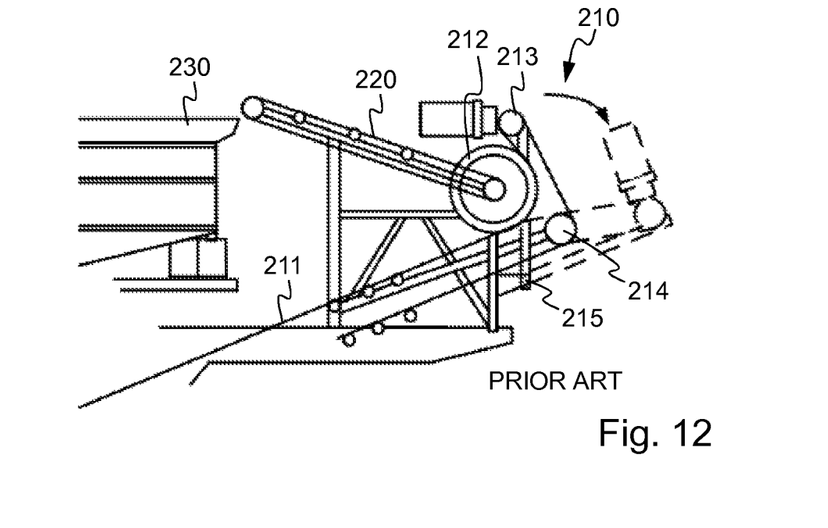
FIG. 12 shows a prior art centrifugal conveyor.

FIG. 12 shows a known centrifugal conveyor 210 which lifts material onto an upper conveyor 220. The upper conveyor feeds a screen 230. A conveyor belt 211 of the centrifugal conveyor is supported at sides to rotate around two idler rollers 212. The upper conveyor belt of the conveyor 220 is moved also by the same idler rollers. The conveyor belt 211 of the centrifugal conveyor circulates via an upper idler drum 213 and returns to the arrival direction after a lower idler drum 214. The centrifugal conveyor pivots open around a pivot 215 for feeding material from the conveyor belt before the upper conveyor what is shown by dashed lines.

An object of the invention is to avoid or at least reduce problems present in connection with prior art. An object of the invention is to provide new technical alternatives. An object of the invention is to enhance serviceability of a mineral material processing plant. An object of the invention is to enhance operation reliability, usability and transportability of a mineral material processing plant. An object of the invention is to simplify a mineral material processing plant. An object of the invention is to enhance processing of mineral material, for example shorten the shutdown time in connection with service.

SUMMARY

According to a first aspect of the invention there is provided a mineral material processing plant which comprises a frame; a crusher; a centrifugal conveyor; and a first conveyor; and the centrifugal conveyor comprises a first idler drum and a second idler drum and a main conveyor belt surrounding said idler drums, a pivot and a folding head which is pivotable around the pivot; and the folding head comprises a movable frame to which the second idler drum is bearing-mounted, to connect the centrifugal conveyor in material transport connection with the first conveyor to move mineral material onto the first conveyor and away from said material transport connection of the folding head to discharge the mineral material directly outside the plant instead of the first conveyor, and a pivot point of the pivot is located in a region inside the circumference of the main conveyor belt.

Preferably the first conveyor comprises a feed hopper to receive material from outside the processing plant.

Preferably a cover plate is fixed to a rear side of the feed hopper and directed rearwards.

Preferably a doctor is arranged to doctor the main conveyor belt at the second idler drum.

Preferably the centrifugal conveyor comprises successive turning rollers which are arranged successively in an upwards curved form in a frame of the centrifugal conveyor to support the main conveyor belt in an operation mode of an opposite transport direction feeding of the centrifugal conveyor.

Preferably turning rollers are arranged at both sides of the main conveyor belt at a side of a transport surface of the main conveyor belt.

Preferably a curvature radius of a curved form which is formed by the successive turning rollers is constant or decreasing in the transport direction of the centrifugal conveyor.

Preferably several turning rollers are assembled to a turning roller set which preferably comprises standardized fixing dimensions with the frame of the centrifugal conveyor.

Preferably an idler drum of the first conveyor and the second idler drum of the centrifugal conveyor are preferably substantially on the same vertical line in an operation mode of the opposite transport direction feeding of the centrifugal conveyor.

Preferably the folding head comprises an idler roller which is arranged along the main conveyor belt circulation between the first idler drum and the second idler drum outside the main conveyor belt circulation.

Preferably the idler roller is fixed to the movable frame of the folding head.

Preferably the centrifugal conveyor is arranged to receive material processed in the processing plant such as in a crusher.

Preferably the centrifugal conveyor is arranged to raise the material transported by it onto the upper first conveyor when said conveyors are connected to the material transport connection.

Preferably a discharge end of the centrifugal conveyor is placed above a starting end of the first conveyor.

Preferably a material discharging region of the main conveyor belt is parallel with a material receiving region of a first conveyor belt comprised by the first conveyor.

Preferably the movable frame of the folding head is forming a side cover for the main conveyor belt.

Preferably the folding head comprises an end cover which together with the movable frame is forming a protective housing.

Preferably the centrifugal conveyor and the first conveyor are arranged at the same longitudinal line in the processing plant.

Preferably the processing plant comprises a second conveyor which is feedable above the crusher by the first conveyor.

Preferably the second conveyor is arranged to move in the longitudinal direction of the crusher by the movement of a four-bar linkage mechanism.

Preferably the processing plant is configured to feed the crusher by the first conveyor when the second conveyor is moved in the longitudinal direction of a screen away from a feed connection of the first conveyor.

Preferably the crusher comprises a feed hopper of the crusher which feed hopper comprises an open pivotable side, and a discharge end of the first conveyor is located in a transport position in between sides of the feed hopper via the open pivotable side.

Preferably the processing plant is a movable screening and crushing plant.

According to a second aspect of the invention there is provided a method for operating a mineral material processing plant which comprises a frame; a crusher; a centrifugal conveyor; and a first conveyor; and the centrifugal conveyor comprises a first idler drum and a second idler drum and a main conveyor belt surrounding said idler drums, a pivot and a folding head which is pivotable around the pivot; and the folding head comprises a movable frame to which the second idler drum is bearing-mounted, to connect the centrifugal conveyor in material transport connection with the first conveyor and away from said material transport connection, and a pivot point of the pivot is arranged in a region inside the circumference of the main conveyor belt, and the folding head comprises an idler roller which is fixed to the movable frame and arranged along the main conveyor belt circulation between the first idler drum and the second idler drum outside the main conveyor belt circulation, and the method comprising pivoting the folding head around the pivot and maintaining tension of the main conveyor belt circulation and travel path thereof between the first and second idler drums by the idler roller.

Preferably changing the tension of the main conveyor belt by moving the first idler drum.

Preferably the crusher is any of the following: a jaw crusher, a horizontal shaft impactor, a vertical shaft impactor, a gyratory crusher, a cone crusher.

Preferably the mineral material processing plant is a movable processing plant such as a movable screening and crushing plant.

The material arriving from below the crusher can be fed onto the starting end of the first conveyor by the centrifugal conveyor. Preferably the first conveyor is equipped with a feed hopper into which material can be fed which is arriving from outside the closed loop process of the plant, additionally to the crusher and/or the screen.

The plant can be fed more freely from either sides or directly from the direction of the feeding end. The feed hopper, when mounted on the centre line of the plant, makes easier the feeding of the plant from outside because the feeding direction is not solely limited at one side of the centre line of the plant.

The conveyors feeding the plant can be mounted in same line or otherwise on top of each other and an extra vibration chute from viewpoint of the process is not necessary.

In some cases the first conveyor and a second conveyor which are movable at different sides of the crusher in the transport position allow mounting of the conveyor at a centre line of the plant what is followed by several advantages. A moving in the side direction of the conveyors is not necessarily needed wherein the plant can be simplified and costs can be lowered.

A conveyor located above the screen must not necessarily be dismounted in order to arrive at the transport height but this conveyor can, without dismounting, be moved towards an uppermost screen deck. In some cases the conveyor can be placed in between sides located at sides of the screen, below the highest height of the sides.

A preferably longitudinally and centrally/at the centre line with regard to the screen mountable conveyor above the screen does not need a separate wearing discharge hopper for discharging material onto the screen, and the discharge point sets at a desired point at the centre line of the screen.

Preferably the first conveyor operated to feed the process may comprise a pivot, and by using this pivot a pivoting of the end of the conveyor in a transport position (transport height) is enabled without moving from place or dismounting the entire conveyor. Taking advantage of the pivot the end of the conveyor can be pivoted upwards which allows a better maintenance space around and above the crusher, for example for using a lifting apparatus when replacing wear parts.

The crusher can be fed directly by the first conveyor or, depending on the plant, for example by the second conveyor which in turn feeds for example the screen.

Expensive and inconvenient mechanisms intended to move the conveyor are left away from the construction. Anyway, one does not need to compromise the service space above the crusher.

The same first conveyor can be used both in plants with and without a screen.

The transport length and/or transport height of the machine can be decreased when the first conveyor and/or the second conveyor do not need to be detached from place.

The width of the conveyor which is feeding the crusher/screen does not directly affect the width of the plant because the conveyor is on the centrifugal conveyor and not beside the centrifugal conveyor. So one can use raising feed conveyors which are broader and, however, a smaller transport width can be implemented. The main conveyor extending from under the crusher does not limit the size of the feed hopper.

The line of the first conveyor feeding the crusher/screen is got higher in a shorter distance because the material raises a long vertical distance at the end portion of the centrifugal conveyor. Accordingly the presented solution enables a substantially shorter processing plant than known previously.

The folding head of the centrifugal conveyor can be formed very compact and easy serviceable. The set of turning rollers formed of several turning rollers, or single turning rollers can be replaced and the maintenance work can be facilitated by pivoting the folding head and the lower conveyor belt with out of the front of the set of turning rollers. The fixing system of the set of turning rollers enables different raises with the lower conveyor, i.a. the constant radius, or the decreasing of the radius in upwards direction wherein the centrifugal force increases with progress in path and material can be raised also with a slower conveyor speed or material can be raised high with a short conveyor. The location of the pivot of the folding head in the region which is inside the circumference of the conveyor belt enables the pivoting of the folding head within a very little longitudinal dimension and volume.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will be described, by way of example, with reference to the accompanying drawings.

DETAILED DESCRIPTION

In the following description, like numbers denote like elements. It should be appreciated that the illustrated drawings are not entirely in scale, and that the drawings mainly serve the purpose of illustrating some example embodiments of the invention.

Figure 1:
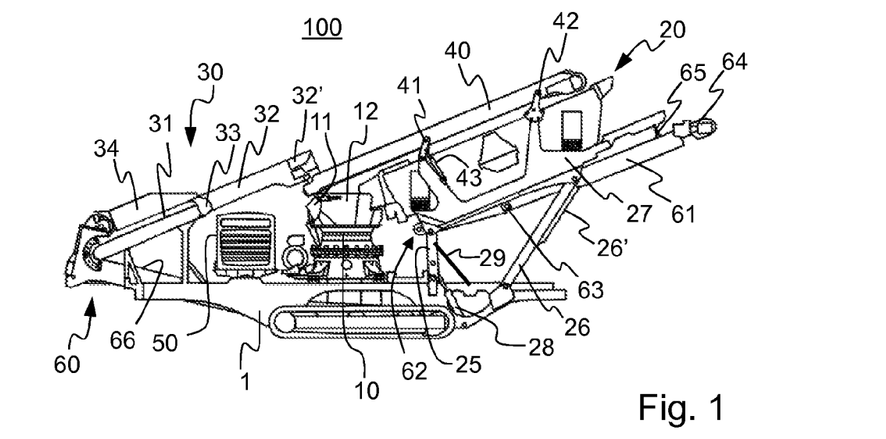
FIG. 1 shows a mineral material processing plant according to a first preferable embodiment of the invention in a screening and crushing position.
Figure 2:
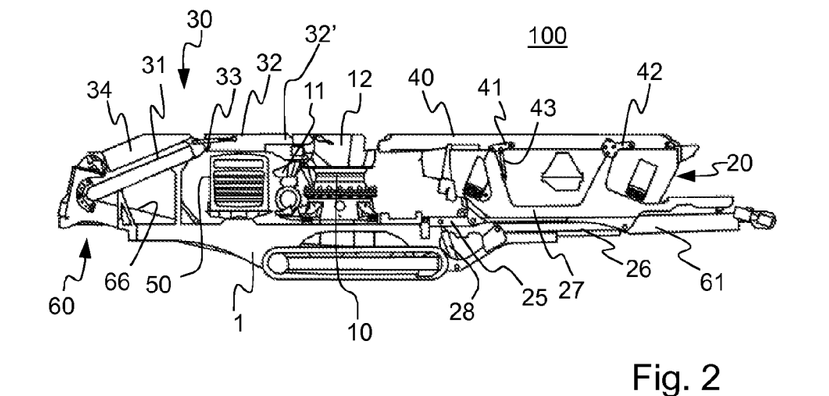
FIG. 2 shows the processing plant of FIG. 1 in a transport position.

A mineral material processing plant 100 shown in FIGS. 1 and 2 comprises a frame 1 and a crusher 10 fixed to the frame, a motor module 50, a centrifugal conveyor 60 as a main conveyor, and further a first conveyor 30. Further the plant comprises a second conveyor 40, a screen 20 and a discharge conveyor 61 which are fixed to the frame by support arms which are forming four-bar linkages. The frame 1 comprises in this embodiment further a track base for moving the processing plant. The crusher or the screen, or both simultaneously can be operated in the processing plant 100 as the processing apparatus.

The centrifugal conveyor receives processed material from the crusher 10 or the screen 20. Material is raised by the centrifugal conveyor onto the first conveyor 30 which is preferably substantially located on the centre line of the plant such as the other conveyor.

The first conveyor 30 and the second conveyor 40 form a conveyor which is connectable in a transport connection and separable in two parts. When the crusher is desired to be operated as the processing apparatus and not the screen, the second conveyor is moved away from the transport connection of the first conveyor, and the first conveyor feeds the crusher 10. When the crusher and the screen are desired to be operated as processing apparatuses, a discharge point 32' of the first conveyor is (preferably above the crusher) above a starting end of the second conveyor, the second conveyor discharges onto the screen and an overs of the screen is fed to the crusher. A discharge point of the second conveyor 40, which is the latter conveyor in the connected transport operation of the conveyors 20, 40, is arranged preferably at the centre line of the screen viewed in the width direction of the screen. When the screen is desired to be operated as the processing apparatus and not the crusher, the second conveyor is in the transport connection with the first conveyor, and the overs of the screen is not guided to the crusher.

The second conveyor 40 is arranged to be moved with the screen 20, preferably to a sub-frame 27 to which the screen 20 is attached. Then the second conveyor moves with the screen to the transport position at the front side of the crusher, i.e. the opposite side in relation to the transport position of the first conveyor which is described in more detail in the following. A screen assembly is supported to the frame of the plant 100 by support arms which form a four-bar linkage, and when the screen is moved to the transport position towards the frame, the screen and the second conveyor moving with the screen move forwards and downwards.

In this description the terms "forward direction", "front side", "front end of the plant" and corresponding ones refer to the same direction as the material transport direction on the first and second conveyors.

The first conveyor 30 and the second conveyor 40 are in an operation position during crushing and screening in FIG. 1. The first conveyor 30 feeds the screen 20 via the second conveyor 40, and the overs of the screen moves from the uppermost screen deck into a feed hopper 12 of the crusher 10. The material dropping through the screen moves outside the plant 100 at least by the discharge conveyor 61 which is below the screen. The overs of possible below screen decks 22, 23 (FIG. 9) etc. can be moved outside the plant by discharge conveyors. Crushable material is brought from outside to the plant 100 into a feed hopper 34 of the first conveyor 30 or directly into the feed hopper 12 of the crusher or in both 10, 34. In FIG. 1 the crushed material moves from the crusher 10 to the main conveyor 60 which moves the material to the first conveyor 30.

The first conveyor 30 and the second conveyor 40 which are movable independently from each other form functionally successively connected a feed conveyor for the screen which feed conveyor preferably passes over the motor module and the screen in the middle of the plant 100 viewed in the width direction of the plant. The conveyors 30, 40 can be moved mainly on different sides of a highest point of the plant formed by the crusher (for example the feed hopper 12 of the crusher), the first conveyor at the rear side of the crusher and the second conveyor at the front side of the crusher.

In sole crushing operation the screen can be passed by moving the second conveyor 40 away from a feed connection of the first conveyor 30. Then the first conveyor can feed directly the crusher 10. Alternatively or additionally, the material to be crushed is fed from outside the plant 100 directly to the feed hopper 12 of the crusher.

The crushed and/or screened material can be moved by the centrifugal conveyor 60 onto the first conveyor 30 or outside the plant by interrupting a feed connection between the centrifugal conveyor 60 and the first conveyor 30. That can be implemented for example by controlling the centrifugal conveyor to discharge the crushed material directly outside the plant 100 instead of the first conveyor 30 what is illustrated with an open pivoted position of a folding head 60' of the centrifugal conveyor 60 shown in FIG. 3.

According to some preferable embodiments the first conveyor 30 pivots due to a pivot 33 to transport and operation positions, and in some cases also to a service position. Then the first conveyor comprises a first material transport part 31 and a second material transport part 32 and the pivot 33 by which the second material transport part is fixed pivotably in relation to the first material transport part.

Figure 9:
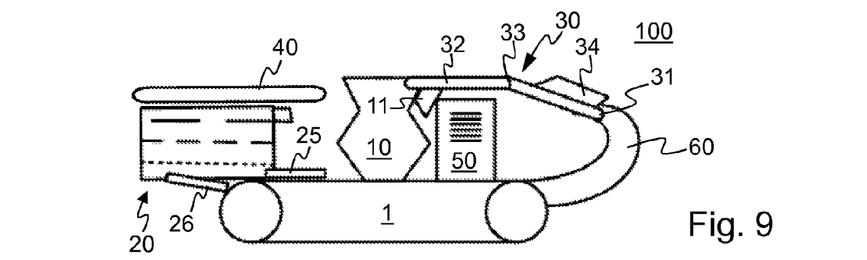

Preferably a starting end of the first conveyor 30 i.e. the first material transport part 31 is fixedly mounted to the plant and an end of the first conveyor i.e. the second material transport part 32 pivots in the transport position above the motor module 50 in horizontal position and so fits in the transport height (FIGS. 2 and 9).

According to a preferable embodiment the first conveyor 30 comprises an endless transport member such as a belt which forms a continuing transport surface over the first material transport part 31 and the second material transport part 32. Preferably the second conveyor 40 comprises an endless transport member such as a belt.

According to another preferable embodiment the first conveyor 30 comprises a first endless transport member such as a first belt in the first material transport part 31 and a second endless transport member such as a second belt in the second material transport part 32 which are forming successive transport surfaces over the first conveyor.

Preferably a highest point of the crusher 10 is defined by the feed hopper 12 which is fixed or integrated to the crusher during the operation of the plant, the feed hopper comprising an open pivotable side 11 at the second material transport part 32 of the first conveyor 30.

According to some preferable embodiments the first conveyor 30 comprises a dust cover (not shown) which is formed above the first 31 and second 32 material transport parts and is foldable at the pivot 33 and preferably forms a uniform dust shielding above the transport surface of the first conveyor. In some embodiments there is no feed hopper on the first material transport part 31. In some embodiments the dust cover on the first material transport part 31 is arranged to begin after the feed hopper in the material transport direction. According to some preferable embodiments the second conveyor 40 comprises a dust cover (not shown) which forms a substantially uniform dust shielding above a transport surface of the second conveyor.

The second conveyor 40 shown in the figures is fixed to a sub-frame 27 of the screen 20 and moves at least part of the way to the transport position with the screen. The screen 20 is fixed preferably in a flexible way to the sub-frame 27. A screen assembly 20, 27 formed by the screen and the sub-frame is supported to the frame 1 of the plant by first support arms 25 and second support arms 26 which form first four-bar linkages together with the frame 1 and the sub-frame 27.

When the screen is moved to the transport position the screen moves both forwards and downwards. Further the inclination of the screen in relation to the horizontal can change if necessary when the four-bar linkage is dimensioned in a desired way. The first four-bar linkages are moved preferably by hydraulic cylinders 28 which act in the examples of the figures between the support arms 25 and the frame 1. When the screen is moved to the transport position there is created service space for replacing wear parts because an upper side of the crusher is left free. Further there is created space for replacing screen meshes because space is created between the crusher and the screen.

Preferably the first four-bar linkage 25, 26, 27, 1 is locked to an upper position for the time of the operation. A locking 29 receives load during screening and makes the operation of the plant safe. Preferably the locking is implemented by reaction bars 29 such as turnbuckles which are adjustable in length. In the upper position of the first four-bar linkage, the turnbuckle 29 is mounted between the support arm 25 and the frame 1 and adjusted to have a suitable length, for example to a desired pretensioning. An example of the fixing of the turnbuckle is fixing of loops at the ends of the turnbuckle by pins to fixing holes in the support arm 25 and the frame 1. The cylinders 28 can be protected by the locking against the load during the operation which occurs for example due to uneven distribution of the material in the screen assembly and the vibrating screening movement of the screen. Preferably an upper end of the turnbuckle is fixed pivotably to the support arm 25 and the lower end is placed in the locking situation to a fixing bracket which is fixed to the frame 1. When moving into the transport position the lower end of the turnbuckle is arranged to glide on an upper surface of the frame to the transport position which is substantially parallel with the upper surface of the frame.

The second conveyor 40 is mounted above the screen 20. The second conveyor can be fixedly mounted in place in relation to the screen but preferably the support of the second conveyor above the screen is movable to make easier the decreasing of the transport height and to move the second conveyor in the longitudinal direction of the plant 100, additionally to the movement distance of the screen. The movability of the second conveyor in longitudinal and height directions provides additional space around the crusher for example for maintenance and lifts, and at the screen for replacing screen meshes.

Preferably movable and pivoted third support arms 41 and fourth support arms 42 support the second conveyor. The pivoted support arms 41, 42 are preferably arranged in pairs at the side of the second conveyor and the screen and form second four-bar linkage mechanisms together with the sub-frame 27 and the second conveyor 40. The second four-bar linkages can be moved by one controllable movement actuator such as a hydraulic cylinder pair 43 which act in the examples of the figures between the support arms 41 and the sub-frame 27, and complex conveyor movement mechanisms with many cylinders can be avoided. The second conveyor can be lowered by these support arms 41, 42 in the transport position as close as possible to the screen so minimizing the transport height.

Preferably the second four-bar linkage mechanism comprises as a locking a pin-hole-combination where the pin is mountable in holes which are formed to the support arm 41, 42 and the sub-frame 27. In the example of FIGS. 1 and 2 a hydraulic cylinder 43 moves the third support arm 41 and the pin-hole locking is arranged to the fourth support arm 42.

The discharge conveyor 61 is fixed to the sub-frame 27 at a first end 62 of the discharge conveyor, preferably below the screen 20 close to a fixing point of the support arm 25. The discharge conveyor 61 is fixed to the sub-frame 27 also at a second point, preferably below the screen 20 (longitudinally in the centre region of the screen) at a conveyor pivot 63 which is formed at the centre region of the screen. A discharge end 64 of the discharge conveyor 61 is distance adjustable with regard to the sub-frame 27 due to the conveyor pivot. The discharge end 64 is supported in the operation position to the sub-frame 27 (an extension of the sub-frame) by a support 65 which defines a maximum distance of the discharge end from the sub-frame and further allows moving of the discharge end towards the sub-frame and the screen. Preferably the support is a chain 65. In the transport position the discharge end 64 relies on the support arm 26 of the frame, preferably on a support structure 26' between parallel support arms 26. When the screen assembly is lowered with the linkage arm mechanism downwards, the discharge end 64 of the discharge conveyor relies on the support structure 26' and the discharge end 64 moves closer towards the screen. A gap between the discharge conveyor 61 and the screen 20 opens slightly when the screen is raised.

In FIG. 2 the first conveyor 30 in the processing plant 100 is in the transport position pivoted to a second position (downwards) mainly to a first side of the crusher. The second conveyor 40 is lowered from the position of the FIG. 1 further downwards closer towards an uppermost screen deck of the screen, mainly to a second side of the crusher, preferably in between sides located at the sides of the screen, wherein the second conveyor 40 is also in the transport position. The discharge end 32' of the second material transport part 32 of the first conveyor 30 is lowered, mainly to a rear side of the crusher 10, through an opening which is formed by an open pivoted side 11 of the feed hopper 12 of the crusher, in between the sides of the feed hopper, preferably on the crusher. Then, the highest points of the first conveyor 30 and the second conveyor 40 are in such a height which substantially does not exceed the height defined by the highest point of the processing apparatus. In case of FIG. 2 the highest point, that is the transport height, of the plant 100 is defined by the side of the feed hopper of the crusher.

FIGS. 3-6 and 11 show the centrifugal conveyor 60 applied in the plant 100 and the first conveyor 30 transporting to an opposite transport direction and located above the centrifugal conveyor. Travel directions of the transported materials are shown with uniform arrows which are drawn above the conveyor belts.

The first conveyor comprises a first conveyor belt 36 which is arranged to travel around an idler drum 37 and supported by inner rollers 38 inside the conveyor belt 36 and outer rollers 39 outside the conveyor belt.

Preferably additionally, a feed hopper 34 is arranged to the first conveyor 30 to guide a material flow 80 fed from outside, for example the material flow fed by a conveyor 81, in between sides 31' of the first conveyor.

The centrifugal conveyor 60 comprises a main conveyor belt 66 which is arranged to travel around a first idler drum 73 and a second idler drum 67 and supported by inner rollers 68 inside the conveyor belt 66 and outer rollers 69 outside the conveyor belt 66. Further the centrifugal conveyor 60 comprises an idler roller 74 which is fixed to a movable frame 71 of the folding head 60' by which idler roller tension and travel path of the main conveyor belt 66 are maintained in different positions of the folding head 60'. The idler roller 74 is arranged along the main conveyor belt circulation 66 between the first idler drum 73 and the second idler drum 67 outside the main conveyor belt circulation 66. The idler roller keeps the main conveyor belt in contact with the first idler drum 73 even in the open pivoted position of the folding head 60' wherein it is not necessary to increase the tension of the main conveyor belt in order to prevent hanging of the main conveyor belt and to keep the main conveyor belt off an end cover 75, 76. By the idler roller 74 the hitting of the main conveyor belt from inside to the end cover 75, 76 operating i.a. as a dust shield can be prevented.

Preferably the first idler drum 73 is bearing-mounted to a frame 79 of the main conveyor 60 which frame 79 is supported to the frame 1 of the processing plant. Preferably the first idler drum 73 is bearing-mounted to a pivot shaft 73' by a pivot arm (not shown in the figures) what enables using the second idler drum for tension adjustment of the main conveyor belt 66 for example after stretching of the main conveyor belt 66 or when the folding head is moved between different operation states.

Figure 11:
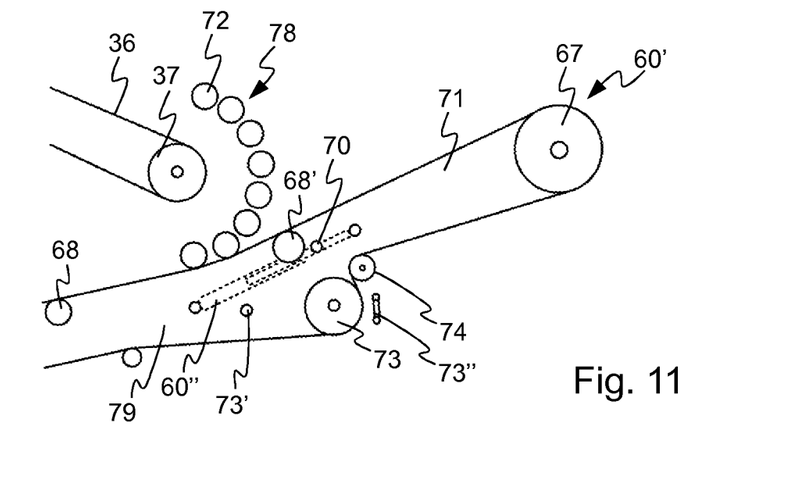

FIG. 11 shows in more detail the environment of the first idler drum 73 in connection with an embodiment. The first idler drum can be forced to a desired position around the pivot shaft 73' by an adjustment mechanism 73". An inner idler roller 68' is preferably conical wherein the diameter of the outer edge is larger than the diameter of the inner edge. Alternatively the idler roller 68' is cylindrical and the idler roller 68' is mounted in an inclined position so that the main conveyor belt 66 sets chute-like. The main conveyor belt 66 can be supported by the idler roller 68' so that an unsupported distance between the second idler drum 67 and the inner support roller 68 does not became too long. An actuator 60" is arranged between the frame 79 of the centrifugal conveyor and the movable frame 71 of the folding head 60' to move the folding head 60' around the pivot shaft 70.

The main conveyor belt 66 is supported at sides to turn, supported by successive turning rollers 72, around the idler drum 37 of the first conveyor 30. Preferably several turning rollers 72 form a turning roller set 78.

In FIGS. 3-6 the idler drum 37 of the upper first conveyor 30 located in front of the turning roller set 78 and the second idler drum 67 of the lower centrifugal conveyor 60 located above the turning roller set are preferably substantially on the same vertical line wherein a space allocation in the longitudinal direction of the plant can be decreased and the feed hopper 34 can be located to the first conveyor 30 as close as possible to the folding point of the conveyors. Then by locating a doctor 77 above the second idler drum 67 of the centrifugal conveyor 60 and fixing a cover plate 35 above the doctor for example to the feed hopper, the flying of material, loosened by the doctor 77 from the main conveyor belt 66, can be prevented or at least reduced.

Figure 6:
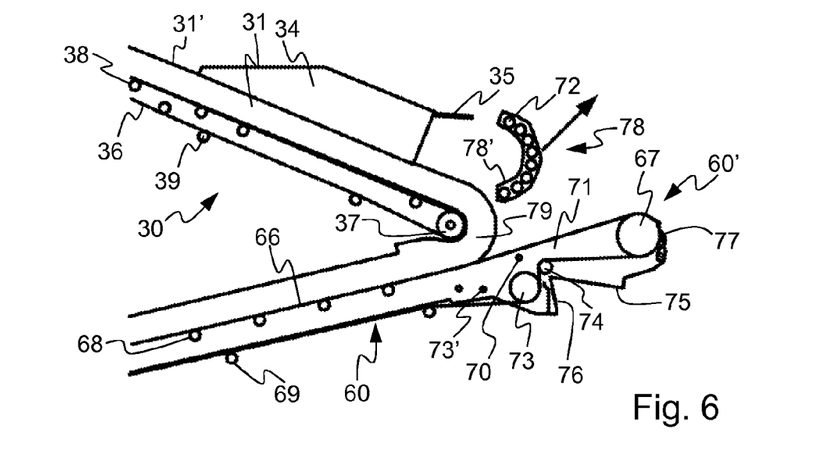
FIG. 6 shows the folding head of FIG. 3 in a service position.

Preferably the turning roller set 78 is dimensioned in a standardized fixing manner to suit in the frame 79 of the centrifugal conveyor 60. The set of turning rollers 78 makes the handling of the turning rollers easier for example in connection with manufacturing, mounting and dismounting. That shortens the shutdown time of the plant. The turning roller set 78 formed by several turning rollers, for example by three or four turning rollers, can be dismounted from the centrifugal conveyor 60 in connection with the maintenance and moved entirely to a service point for replacing the rollers. The turning roller set may comprise all turning rollers 72 at one side of the belt 66 as one assembly as shown in FIG. 6. The turning roller set can be replaced with a corresponding or a different pre-assembled turning roller set having same fixing dimensions to the frame 79 of the centrifugal conveyor. The turning rollers 72 of the turning roller set are preferably fixed at ends to two plates 78', the inner of which plates being in contact with the material transported with the centrifugal conveyor and preventing entry of material between the turning rollers and the belt. The outer plate is fixed to the frame 79 of the centrifugal conveyor and prevents entry of dust/stones arriving from outside the conveyor between the turning rollers and the conveyor belt 66.

The fixing system of the set of turning rollers 78 enables different raises with the lower conveyor. A constant radius is shown in the figures. Alternatively the radius is decreasing along the travel upwards wherein the centrifugal force increases along the travel and material can be raised also with a slower conveyor speed.

The second idler drum 67 is bearing-mounted to pivot around the pivot 70 which is formed to the frame of the centrifugal conveyor 60. The folding head 60' pivots between two operation states so that the pivot point of the pivot is located in both operation states in a region inside the circumference of the main conveyor belt 66. In the known solution shown in FIG. 12 the pivot 215 is abundantly below the conveyor 210, 211. The advantage relative to the prior is that the pivoting takes place in a smaller volume.

Preferably the pivot 70 of the folding head 60' is arranged in the region between the second idler drum 67 and the first idler drum 73. The second idler drum 67 and the idler roller 74 are bearing-mounted to the movable frame 71 of the folding head 60' which is bearing-mounted to pivot around the pivot 70.

The locating of the pivot 70 centrally in the region of the folding head 60' is followed by the advantage that i.a. the shielding of the movable parts of the folding head 60' and dust shielding can be formed structurally compact what shortens the apparatus. Further safety at work can be enhanced because movable parts through the shielding such as support arms are not necessary to be formed to the construction. The shielding can be made tight. A risk that the operator ends up in open throats of the pivoting mechanism is decreasing or avoided. The shielding prevents dust, stones, hands, feet, etc. undesired particles from entering in between the conveyor belts and the rollers.

The frame 71 of the folding head forms side covers which surround the movable parts such the turning rollers 72 and the conveyor belt 66 at the side. The end cover is also attached to the frame 71 and comprises a first cover 75 and a second cover 76. Preferably the first cover 75 and the second cover 76 are connected to each other for example by a pivot 75' (FIG. 5) wherein the end cover 75, 76 forms a unitary cover between the side covers 71 of the folding head 60' in different pivoting positions of the folding head. The frame 71 of the folding head the end cover 75, 76, 75' form a protective housing. The protective housing prevents i.a. dust and stones etc. foreign objects from entering inside the protective housing.

Figure 3:
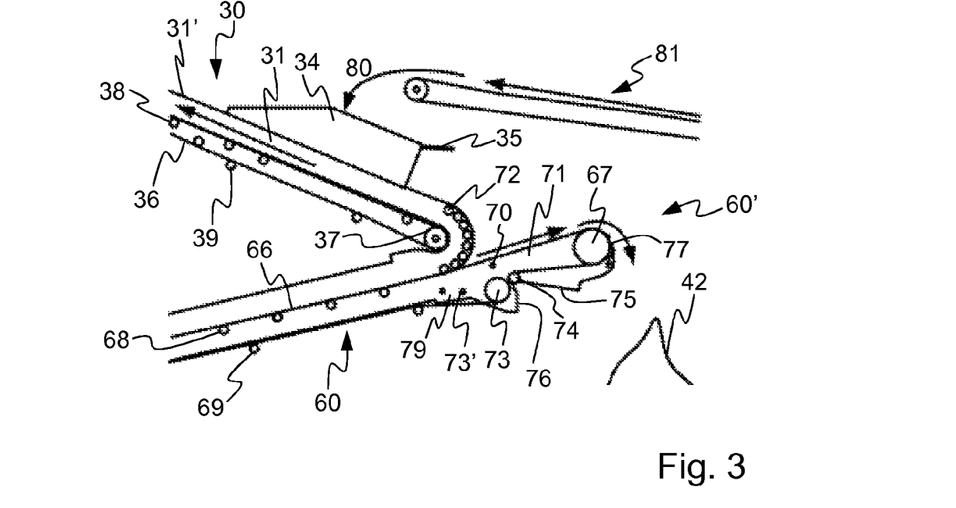
FIG. 3 shows a folding head formed in a centrifugal conveyor of a processing plant pivoted in an open position.

FIG. 3 shows the folding head 60' formed in the centrifugal conveyor 60 of the processing plant 100 in an open pivoted position where material is discharged to a pile 82. The turning rollers 72 are displayed and the idler roller 74 maintains the tension of the belt 66. The lower cover 76 continues to shield the first idler drum 73 during the pivoting of the folding head 60'. Material 80 can be fed to the plant via an optional feed hopper 34.

Figure 4:
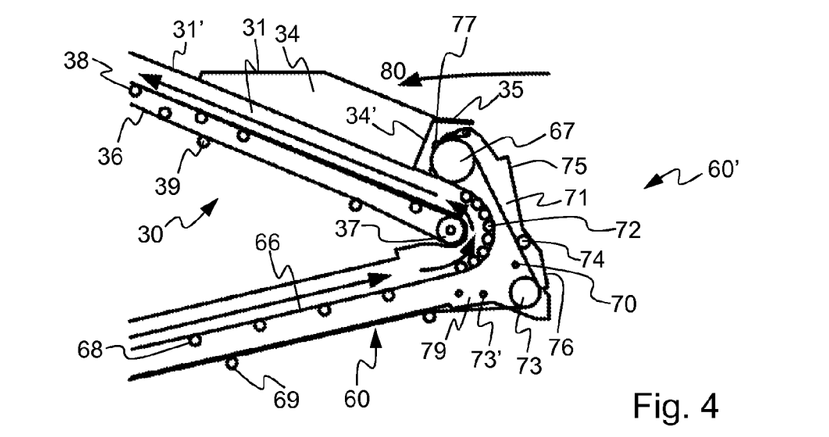
FIG. 4 shows the folding head of FIG. 3 pivoted in a closed position.

In the centrifugal transport position of FIG. 4 the folding head 60' is moved to a closed position where the main conveyor 60 and the first conveyor 30 are in transport connection. In the closed position the covers 75, 76 of the folding head 60' form a connected protective housing which does not have throats formed by moving members. Material 80 can be fed to the optional feed hopper 34.

The material can be raised by the centrifugal conveyor 60 onto the first conveyor 30 so that the material leaves the centrifugal conveyor to the first conveyor substantially in the direction of the conveyor belts. Then the stone is not thrown towards the conveyor belt 36 of the first conveyor and secondly not towards a rear wall 34' of the feed hopper 34. Preferably a material discharging region of the main conveyor belt 66 is parallel with a material receiving region of the first conveyor belt 36 in a raising position of the centrifugal conveyor.

Figure 5:
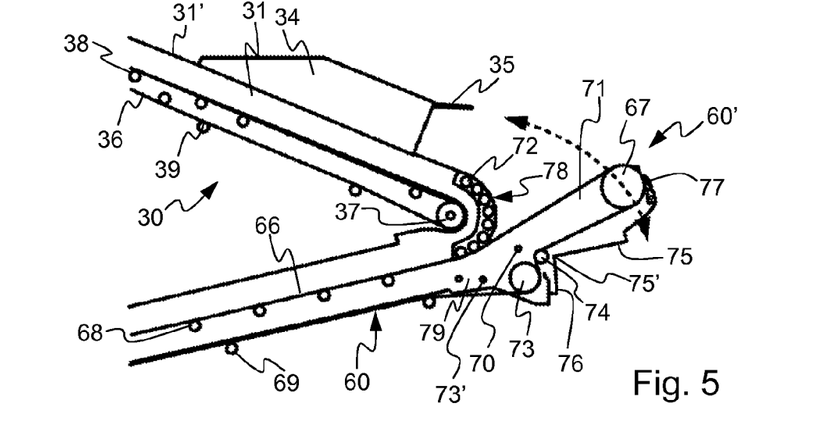
FIG. 5 shows the movement of the folding head of FIG. 3.

In FIG. 5, it is possible to feed outside the plant in a lower section of the movement range of the folding head 60'. The turning roller sets 78 are revealed for service when the main conveyor belt is pivoted backwards. The tensioning roller 74 keeps the main conveyor belt 66 tensioned.

A doctor can be arranged in connection with the idler roller 74 (such as the doctor 77 of the idler drum 67) which keeps the surface of the idler roller clean from any dropping particles from the conveyor and prevents entry thereof in between the idler roller and the conveyor belt. The doctor can be attached for example between the pivot 70 or 73'.

FIG. 6 shows the folding head 60' in a service position. The centrifugal conveyor is formed easily serviceable. It is not necessary to dismount the first conveyor in connection with the handling of the turning rollers 78 but even single turning rollers 72 can be detached and attached if necessary. The condition of the centrifugal conveyor and the turning rollers is easy to check by pivoting the folding head 60' open to the service position.

In the processing plant 100 of FIGS. 7-10 the screen 20 is illustrated as a multilayer or multi-deck screen which comprises a first screen deck 21 and a desired number underneath screen decks such as a second screen deck 22 and a third screen deck 23. The screen is supported to the frame by pivoted support arms 25, 26 which form a four-bar linkage together with the screen and the frame. The centrifugal conveyor 60 is pivoted in a closed position.

Figure 7:
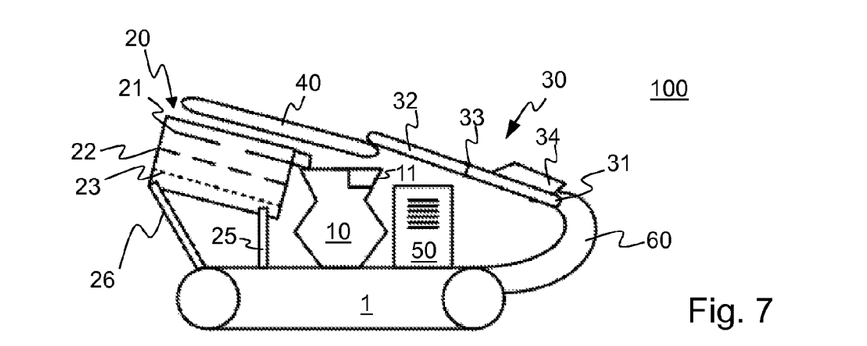
FIGS. 7-11 show the processing plant of FIG. 1 in different positions of the conveyors.

In FIG. 7 the first conveyor 30 and the second conveyor 40 are during the screening and the crushing in the same operation position as in FIG. 1. The overs of the uppermost screen deck 21 is guided from the screen to the crusher. The screen 20 comprises support arms 25, 26 to move the screen and the second conveyor 40 to the operation position and away from the operation position.

Figure 8:
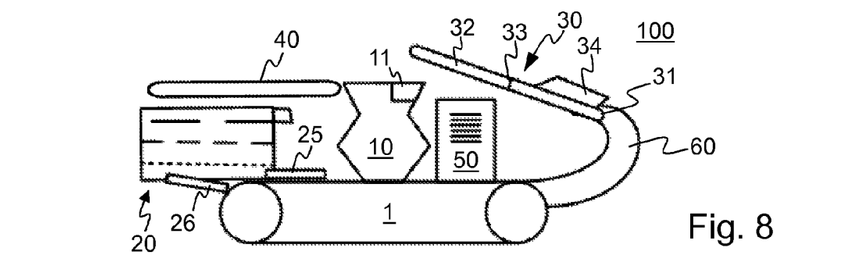

In FIG. 8 the first conveyor 30 of the processing plant 100 is in the operation position feeding directly the crusher 10. The screen 20 is not operated during the crushing in the position of FIG. 8. The screen 20 and the second conveyor 40 are moved away from the operation position by the support arms 25, 26 and supported by the support arms which are pivotable in the longitudinal direction of the plant 100, and lowered closer to the frame 1 of the plant. The second conveyor 40 is moved away from the feeding connection of the first conveyor 30 by the movement of the linkage mechanism 25, 26 which is supporting the screen. Preferably the starting end of the second conveyor 40 is moved to the other side of the crusher than the first conveyor when viewed in the longitudinal direction of the plant, wherein the screen can be serviced while the conveyor 40 is still in the operation position with regard to the screen 20 or moved even higher than the operation position supported by the support arms 41, 42.

In FIG. 9 the first conveyor 30 of the processing plant 100 is in the transport position pivoted to the second position (preferably in the horizontal position). The second conveyor 40 is also in the transport position (preferably in the horizontal position). The discharge end of the second material transport part 32 is lowered, through an opening which is formed by an open pivoted side 11 of the feed hopper of the crusher 10, in between the sides of the feed hopper, preferably on the crusher. Then, the highest points of the first conveyor 30 and the second conveyor 40 are in a height which substantially does not exceed the height defined by the highest point of the processing apparatus.

Figure 10:
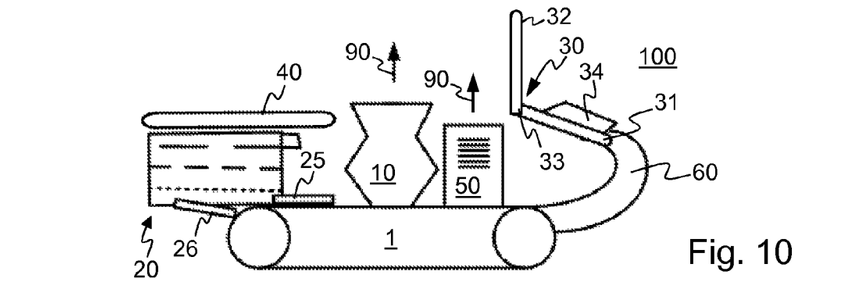

In FIG. 10 the discharge end of the second material transport part 32 is pivoted from the position of FIG. 8 to an opposite pivoting direction in relation to the first position (preferably vertically upwards) for example for service. In this third position the projection of the discharge end of the second material transport part is arranged to leave free the lifting centres of the crusher 10 and the motor module 50 when viewed from above. A lifting apparatus 90 such as a lifting rope and a gripping member do not hit the second material transport part 32 during lifting of the motor module 50. The third position enables the lifting, for example in connection with the service, of the crusher, a wear part of the crusher or the motor module without having to remove from place or detach the first conveyor 30. Preferably in the third position the projection of the discharge end when viewed from above does not meet the projection of the processing apparatus or the motor module, or is arranged to leave free the projection of the processing apparatus/motor module. Preferably, when the processing apparatus or the motor module or a part thereof is lifted from a centre or a gravity centre, a lifting space is freed up for a lifting wire at least at the gravity centre of the processing apparatus. Also the second conveyor 40 is moved on the screen farther from the crusher 10 (such as in FIG. 9) allowing service and lifting.

The processing plants presented above may also be entirely or partly wheel based or movable on legs instead of the track base. Alternatively the processing plant may be movable/towable for example by a truck or another external power source. Further to the above presented the processing plant may also be a stationary processing plant.

The foregoing description provides non-limiting examples of some embodiments of the invention. It is clear to a person skilled in the art that the invention is not restricted to details presented, but that the invention can be implemented in other equivalent means.

Some of the features of the above-disclosed embodiments may be used to advantage without the use of other features. As such, the foregoing description shall be considered as merely illustrative of principles of the invention, and not in limitation thereof. Hence, the scope of the invention is only restricted by the appended patent claims.

The invention claimed is:

1. A mineral material processing plant comprising:
   a frame;
   a crusher;
   a centrifugal conveyor; and
   a first conveyor; and
   the centrifugal conveyor comprises a first idler drum and a second idler drum and a main conveyor belt surrounding said idler drums, a pivot and a folding head which is pivotable around the pivot; and
   the folding head comprises a movable frame to which the second idler drum is bearing-mounted, to connect the centrifugal conveyor in material transport connection with the first conveyor and away from said material transport connection;
   wherein a pivot point of the pivot is located in a region inside the circumference of the main conveyor belt.

2. The processing plant according to claim 1, wherein the first conveyor comprises a feed hopper to receive material from outside the processing plant.

3. The processing plant according to claim 2, wherein a cover plate is fixed to a rear side of the feed hopper and directed rearwards.

4. The processing plant according to claim 1, wherein a doctor is arranged to doctor the main conveyor belt at the second idler drum.

5. The processing plant according to claim 1, wherein the centrifugal conveyor comprises successive turning rollers which are arranged successively in an upwards curved form in a frame of the centrifugal conveyor to support the main conveyor belt in an operation mode of an opposite transport direction feeding of the centrifugal conveyor.

6. The processing plant according to claim 5, wherein turning rollers are arranged at both sides of the main conveyor belt at a side of a transport surface of the main conveyor belt.

7. The processing plant according to claim 5, wherein a curvature radius of a curved form which is formed by the successive turning rollers is constant or decreasing in the transport direction of the centrifugal conveyor.

8. The processing plant according to claim 5, wherein several turning rollers are assembled to a turning roller set which preferably comprises standardized fixing dimensions with the frame of the centrifugal conveyor.

9. The processing plant according to claim 1, wherein an idler drum of the first conveyor and the second idler drum of the centrifugal conveyor are preferably substantially on the same vertical line in an operation mode of an opposite transport direction feeding of the centrifugal conveyor.

10. The processing plant according to claim 1, wherein the folding head comprises an idler roller which is arranged along the main conveyor belt circulation between the first idler chum and the second idler drum outside the main conveyor belt circulation.

11. The processing plant according to claim 10, wherein the idler roller is fixed to the movable frame of the folding head.

12. The processing plant according to claim 1, wherein the centrifugal conveyor is arranged to receive material processed in the processing plant such as in a crusher.

13. The processing plant according to claim 1, wherein the centrifugal conveyor is arranged to raise the material transported by it onto the upper first conveyor when said conveyors are connected to the material transport connection.

14. The processing plant according to claim 1, wherein a discharge end of the centrifugal conveyor is placed above a starting end of the first conveyor.

15. The processing plant according to claim 1, wherein a material discharging region of the main conveyor belt is parallel with a material receiving region of a first conveyor belt comprised by the first conveyor.

16. The processing plant according to claim 1, wherein the movable frame of the folding head is forming a side cover for the main conveyor belt.

17. The processing plant according to claim 1, wherein the folding head comprises an end cover which together with the movable frame is forming a protective housing.

18. The processing plant according to claim 1, wherein the centrifugal conveyor and the first conveyor are arranged at the same longitudinal line in the processing plant.

19. The processing plant according to claim 1, comprising a second conveyor which is feedable above the crusher by the first conveyor.

20. The processing plant according to claim 19, wherein the second conveyor is arranged to move in the longitudinal direction of the crusher by the movement of a four-bar linkage mechanism.

21. The processing plant according to claim 19, wherein the processing plant is configured to feed the crusher by the first conveyor when the second conveyor is moved in the longitudinal direction of a screen away from a feed connection of the first conveyor.

22. The processing plant according to claim 1, wherein the crusher comprises a feed hopper of the crusher which feed hopper comprises an open pivotable side, and a discharge end of the first conveyor is located in a transport position in between sides of the feed hopper via the open pivotable side.

23. The processing plant according to claim 1, wherein the processing plant is a movable screening and crushing plant.

24. A method for operating a mineral material processing plant which comprises the following steps: providing
a frame;
a crusher;
a centrifugal conveyor; and
a first conveyor; and
the centrifugal conveyor comprises a first idler drum and a second idler drum and a main conveyor belt surrounding said idler drums, a pivot and a folding head which is pivotable around the pivot; and
the folding head comprises a movable frame to which the second idler drum is bearing-mounted to connect the centrifugal conveyor in material transport connection with the first conveyor and away from said material transport connection;
wherein a pivot axis of the pivot is arranged in a region inside the circumference of the main conveyor belt, and the folding head comprises an idler roller which is fixed to the movable frame and arranged along the main conveyor belt circulation between the first idler drum and the second idler drum outside the main conveyor belt circulation; and
the method further comprising pivoting the folding head around the pivot and maintaining tension of the main conveyor belt circulation and travel path thereof between the first and second idler drums by the idler roller.

25. The method according to claim 24, comprising changing the tension of the main conveyor belt by moving the first idler drum.

\* \* \* \* \*